US010027658B1

(12) United States Patent
Schwarz et al.

(10) Patent No.: US 10,027,658 B1
(45) Date of Patent: Jul. 17, 2018

(54) SEAMLESS PROVISION OF SECRET TOKEN TO CLOUD-BASED ASSETS ON DEMAND

(71) Applicant: CyberArk Software Ltd., Petach-Tikva (IL)

(72) Inventors: Rafi Schwarz, Ramat-Gan (IL); Eli Maccabi, Rishon Letzion (IL); Moti Cohen, Rishon Letzion (IL); Nessi Lahav, Tiberias (IL); Inbal Zilberman Kubovsky, Ganei Tikva (IL); Evgeny Sakirko, Tel Aviv-Jaffa (IL)

(73) Assignee: CYBERARK SOFTWARE LTD, Petach-Tikva (IL)

( * ) Notice: Subject to any disclaimer, the term of this patent is extended or adjusted under 35 U.S.C. 154(b) by 0 days.

(21) Appl. No.: 15/620,262

(22) Filed: Jun. 12, 2017

(51) Int. Cl.
*H04L 29/06* (2006.01)

(52) U.S. Cl.
CPC ........ *H04L 63/083* (2013.01); *H04L 63/0853* (2013.01); *H04L 63/10* (2013.01)

(58) Field of Classification Search
CPC .... H04L 63/083; H04L 63/0853; H04L 63/10
See application file for complete search history.

(56) References Cited

U.S. PATENT DOCUMENTS

| | | | |
|---|---|---|---|
| 9,129,095 B1* | 9/2015 | Lam | G06F 21/6218 |
| 9,473,419 B2* | 10/2016 | Brand | H04L 67/1097 |
| 2013/0263242 A1* | 10/2013 | Jain | G06F 21/78 |
| | | | 726/9 |
| 2014/0215590 A1* | 7/2014 | Brand | H04L 67/1097 |
| | | | 726/6 |
| 2016/0182465 A1* | 6/2016 | Lam | G06F 21/6218 |
| | | | 713/171 |
| 2016/0294827 A1* | 10/2016 | Besprosvan | H04L 63/0876 |

OTHER PUBLICATIONS

Hacker News, "Vault—A Tool for Managing Secrets" (https://news.ycombinator.com/item?id =9453754); accessed Jun. 7, 2017.

(Continued)

*Primary Examiner* — Mahfuzur Rahman
(74) *Attorney, Agent, or Firm* — Finnegan, Henderson, Farabow, Garrett & Dunner LLP (57) ABSTRACT

The disclosed embodiments include systems and methods for providing security tokens to cloud-based assets on demand. Operations performed in the disclosed embodiments include receiving a prompt from a cloud-based asset indicating that the cloud-based asset is seeking to communicate with an access-controlled resource, wherein the cloud-based asset lacks authorization to communicate with the access-controlled resource. Additionally, the operations include extracting information associated with the cloud-based asset by accessing a trusted cloud platform resource storing data associated with verified cloud-based assets, where the trusted cloud platform resource is separate from the cloud-based asset, and authenticating the cloud-based asset based on the extracted information. The operations also include generating a security token for the cloud-based asset, making a first portion of the security token available to be injected into the cloud-based asset, and responding to the prompt with a second portion of the security token.

22 Claims, 3 Drawing Sheets

(56) References Cited

OTHER PUBLICATIONS

Bechberger, Dave, "Managing Secrets in a Cloud World—Introduction"; (https://www.experoinc.com/post/managing-secrets-in-a-cloud-world-introduction) accessed Jun. 12, 2017.

Bechberger, Dave, "Managing Secrets in a Cloud World—Part 1 (Azure Key Vault)", https://www.experoinc.com/post/managing-secrets-in-a-cloud-world-part-1-azure-key-vault); accessed Jun. 12, 2017.

Bechberger, Dave, "Managing Secrets in a Cloud World—Part 2": (https://www.experoinc.com/post/managing-secrets-in-a-cloud-world-part-2); accessed Jun. 12, 2017.

"Secrets:Write-up best practices, do's and dont's, roadmap", (https://github.com/moby/moby/Issues/13490): accessed Jun. 12, 2017.

"Auth Backend: aws" (http://www.vaultproject.io/docs/auth/aws.html) accessed Jun. 12, 2017.

"Instance Metadata and User Data"(http://docs.aws.amazon.com/AWSEC2/latest/UserGuide/ec2-instance.metadata.html) accessed Jun. 12, 2017.

"Instance Identity Documents" (http://doc.aws.amazon.com/AWSEC2/latest/UserGuide/instance-identity-documents.html) accessed Jun. 12, 2017.

\* cited by examiner

SEAMLESS PROVISION OF SECRET TOKEN TO CLOUD-BASED ASSETS ON DEMAND

BACKGROUND

Cloud-based virtualization techniques have greatly improved the speed and agility in application development and deployment of services. A common form of cloud-based virtualization platform includes a virtual machine. A virtual machine may be generally characterized as a server virtualization platform, in which a virtual machine with its own unique operating system and dedicated kernel is designed to emulate a particular hardware system on top of the physical server. A single physical server infrastructure may service multiple virtual machines emulating different hardware systems, thus enabling the deployment of different applications on a single server. Another particular form of a cloud-based virtualization platform or deployment infrastructure is referred to as containerization. Containerization, also called container-based virtualization or application containerization, is an operating system (OS) level virtualization method for deploying and running distributed applications. Instead of spinning up a virtual machine emulating a particular hardware environment, multiple isolated systems, called containers, are run on a single control host operating system and access a single kernel. Because containers do not have the overhead required by a virtual machine, such as a separate, dedicated OS instance, it is possible to support many more containers on the same infrastructure. Thus, containerization can improve performance because a single OS may be operating to handle the numerous hardware calls for the containerized platform.

Software-based applications generally require a secret, such as a password, key, credential, token, or certificate to access controlled assets in an enterprise or organization. The required secret is generally used to authenticate the application against other spurious or unknown applications attempting to access enterprise resources. Some known techniques today provide an application with a predetermined, initial secret for validating the application. This predetermined secret may be hard-coded into the application itself. Such hard-coded, predetermined secrets, however, may be easily discovered and, if obtained by a malicious actor, could be used by a spurious application to launch an attack on an enterprise. These same techniques have been applied in cloud-based application deployment. But the risk is magnified in distributed cloud platforms where an application may be replicated numerous times among many distributed virtualization platforms thereby increasing the exposure of the predetermined secret, and making it more susceptible to discovery. Furthermore, because the predetermined secret may be shared among the many distributed applications, a compromised secret may be used to inflict a more widespread attack. For example, due to the shared access to a single host OS by the many different container instances in a containerized platform, a single security threat may pose a greater risk to an entire system.

Other techniques for authenticating an application include querying the operating system running the application to verify the application's authenticity. But in a virtualized platform environment, this technique is not feasible. For example, a containerized application runs as an isolated process in a user space on the shared host OS, and in a virtual machine environment, the VM's dedicated OS is isolated from the host OS. Thus, it may not be feasible to query the host OS of the server infrastructure to obtain information for authenticating the application running in the virtualization platform (e.g., the container or Virtual Machine). In other words, it is not an easy and feasible task to isolate the required information for authenticating an application instance running in cloud-based virtualization platforms.

Thus, there is a need for technological solutions for securing a virtual system environment with capabilities for validating virtual instances that do not rely on predetermined authentication data associated with an application. A technological solution is needed for providing only those authorized instances with a credential or security token that may be required to authenticate requests from the application for accessing one or more target assets or services. Such a solution is needed to protect virtualized platform environments from malicious and/or unauthorized virtualized applications accessing a compromised predetermined secret and using such a secret for accessing target assets and services.

SUMMARY

The disclosed embodiments describe systems and methods for providing a security token to a cloud asset, which may be performed on demand in a seamless manner independent from the system hosting the cloud asset.

According to a disclosed embodiment, a computer readable medium includes instructions that, when executed by at least one processor, cause the at least one processor to perform operations for providing security tokens to cloud-based assets on demand. The operations include receiving a prompt from a cloud-based asset indicating that the cloud-based asset is seeking to communicate with an access-controlled resource, wherein the cloud-based asset lacks authorization to communicate with the access-controlled resource, and extracting information associated with the cloud-based asset by, at least in part, accessing a trusted cloud platform resource storing data associated with verified cloud-based assets, the trusted cloud platform resource being separate from the cloud-based asset. The operations also include authenticating the cloud-based asset based on the extracted information, generating a security token for the cloud-based asset, making a first portion of the security token available to be injected into the cloud-based asset, and responding to the prompt with a second portion of the security token.

According to a disclosed embodiment, the extracting operation may involve invoking the trusted cloud platform resource to interoperate with the cloud-based asset to obtain at least part of the extracted information, or the extracting may involve interoperating directly with the cloud-based asset.

According to a disclosed embodiment, the security token is unique to the cloud-based asset and may be unique to a virtualization platform deploying the cloud based asset, such as a particular container or particular virtual machine. The first portion of the security token includes random data and data associated with the cloud-based asset, and the second portion of the security token includes expiration time data and a token signature. In the disclosed embodiments, the cloud-based asset may access the access-controlled resource based on the first portion of the security token and the second portion of the security token.

According to a disclosed embodiment, the steps of receiving a prompt, extracting, accessing, authenticating, generating, making, and responding are performed by the trusted cloud platform resource.

According to a disclosed embodiment, the prompt identifies a container associated with the cloud-based asset, additionally or alternatively the prompt indicates a location attribute of the cloud-based asset, and the prompt may also indicate an environment attribute of the cloud-based asset.

According to a disclosed embodiment, the step of making a first portion of the security token available to be injected into the cloud-based asset includes sending the first portion of the security token to a cloud resource separate from the cloud-based asset. The disclosed embodiment may also include requesting the cloud resource to inject the first portion of the security token into the cloud-based asset, and wherein the step for responding to the prompt with a second portion of the security token occurs after receiving an indication that the first portion of the security token has been injected into the cloud-based asset.

A disclosed embodiment may also include steps for allowing the cloud-based asset to obtain a credential needed for accessing the access-controlled resource based on the first portion of the security token and the second portion of the security token, wherein the credential may be injected into the cloud-based asset. In a disclosed embodiment, the cloud-based asset may be enabled to access the access-controlled resource based on the first portion of the security token and the second portion of the security token.

According to a disclosed embodiment, a computer readable medium includes instructions that, when executed by at least one processor cause the at least one processor to perform operations for providing security tokens to cloud-based assets on demand. The operations include receiving a prompt from a cloud-based asset indicating that the cloud-based asset is seeking to communicate with an access-controlled resource, wherein the cloud-based asset lacks authorization to communicate with the access-controlled resource, and extracting information associated with the cloud-based asset by, at least in part, accessing a trusted cloud platform resource storing data associated with verified cloud-based assets, the trusted cloud platform resource being separate from the cloud-based asset. The operations also include authenticating the cloud-based asset based on the extracted information, generating a security token for the cloud-based asset, and making at least a first portion of the security token available to be injected into the cloud-based asset, thereby enabling the cloud-based asset to access the access-controlled resource.

According to another disclosed embodiment, a server system is provided for providing security tokens to a cloud-based asset on demand. The system includes a memory device storing a set of instructions, and a processor configured to execute the set of instructions to perform operations to receive a prompt from a cloud-based asset indicating that the cloud-based asset is seeking to communicate with an access-controlled resource, wherein the cloud-based asset lacks authorization to communicate with the access-controlled resource, and to extract information associated with the cloud-based asset by, at least in part, accessing a trusted cloud platform resource storing data associated with verified cloud-based assets, the trusted cloud platform resource being separate from the cloud-based asset. Additional operations may be performed to authenticate the cloud-based asset based on the extracted information, generate a security token for the cloud-based asset, make a first portion of the security token available to be injected into the cloud-based asset, and respond to the prompt with a second portion of the security token.

According to another disclosed embodiment, a computer implemented method is executable by a processor of a computing system for providing a security token to a cloud-based asset on demand. The method comprises receiving a prompt from a cloud-based asset indicating that the cloud-based asset is seeking to communicate with an access-controlled resource, wherein the cloud-based asset lacks authorization to communicate with the access-controlled resource, and extracting information associated with the cloud-based asset by, at least in part, accessing a trusted cloud platform resource storing data associated with verified cloud-based assets, the trusted cloud platform resource being separate from the cloud-based asset. The method also includes authenticating the cloud-based asset based on the extracted information, generating a security token for the cloud-based asset, making a first portion of the security token available to be injected into the cloud-based asset, and responding to the prompt with a second portion of the security token Aspects of the disclosed embodiments may include tangible computer-readable media that store software instructions, that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The disclosed embodiments include systems and methods for securing the supply and use of an authentication credential or secret (e.g., a security token) to a cloud-based asset on demand. The authentication credential or security token may be uniquely associated with the cloud-based asset and may be used by the cloud-based asset in subsequent requests for access to access-controlled resources. The disclosed embodiments need not rely on a predetermined secret to validate a cloud-based asset. Instead, a security token may be provided to the cloud-based asset according to the disclosed embodiments only upon validating a virtualization platform deploying the cloud-based asset and/or validating the cloud-based asset itself. In the disclosed embodiments, a cloud-based asset may use the authentication credential or security token to verify its authenticity and to access or communicate with an access-controlled resource or other asset in subsequent requests. In the disclosed embodiments, the authentication credential may be provided to the cloud-based asset on demand by an interactive security service. Thus, the disclosed embodiments include processes to verify or validate a cloud-based asset as a trusted or verified cloud-based asset and to provide a security token to the verified cloud-based asset.

A cloud-based asset in the disclosed embodiments may include any application or automated process or tool or instance running or executable in a cloud-based platform. In the disclosed embodiments, a cloud-based asset may be operating in any type of cloud-based virtualization environment. In some embodiments, for example, the cloud-based asset may be executable or running within a virtual machine with its own dedicated operating system or may be executable or running within one of a plurality of containers sharing a host operating system. The disclosed embodiments are applicable to any cloud infrastructure or virtualization environment, whether implemented as a virtual machine or one of a plurality of containers or any other virtual implementation. In the disclosed embodiments, a discrete virtual implementation deploying a cloud-based asset may generally be referred to as a virtualization platform, whereas a general cloud environment of one or more servers hosting one or more virtual machines or a plurality of containers, or some combination of both, generally may be referred to as a virtualization platform environment. In some embodiments, a virtualization platform itself may be referred to as a cloud-based asset.

In the disclosed embodiments, a virtualization platform environment may include or be associated with a trusted cloud platform resource that is configured to at least store information about each of a plurality of virtualization platforms configured for and authorized for being deployed within the virtualization platform environment. Generally, a virtualization platform environment is controlled or configured by a system administrator, for example, to implement one or more authorized virtualization platforms, each having particular characteristics, configurations, privileges, etc. Generally a virtualization platform may be run, spun up, or loaded, according to particular specifications of a system image and other configuration information. In the disclosed embodiments, this configuration information may be stored or managed by the trusted cloud platform resource, which in some embodiments may be referred to as a Trusted Registry or a platform manager, for example. In some embodiments, the trusted cloud platform resource is distinct and separate from and operates independently from the virtualization platforms and the cloud-based assets deployed within each virtualization platform.

In the disclosed embodiments, the interactive security service performs techniques for validating and authenticating a cloud-based asset based at least in part on an autonomous investigation and validation of the virtualization platform deploying the cloud-based asset. In some embodiments, the virtualization platform is validated based on information held or managed by the trusted cloud platform resource, such as a virtualization platform manager or a trusted registry. Thus, in the disclosed embodiments, a cloud-based asset, such as a deployed application within a container, is validated based on information obtained independently from a trusted cloud platform resource, thereby overcoming certain drawbacks of existing systems that rely on initial authentication data held by an application (that may be compromised) to validate the application. Thus, the techniques for validating and authenticating the cloud-based asset in the disclosed embodiments need not rely on a credential or other secret knowledge (e.g., authentication data) initially obtained by the cloud-based asset. Instead a cloud-based asset may be validated based on characteristics or configurations of the cloud-based asset and the virtualization platform deploying the cloud-based asset that is known to or managed by the trusted cloud platform resource. In this way, a malicious cloud-based asset may be unable to obtain access to enterprise resources by possessing compromised predetermined authentication data.

The disclosed embodiments also include techniques for generating or providing an authentication credential, such as a security token, to a trusted cloud-based asset upon verifying the validity of the cloud-based asset and/or the virtualization platform deploying the cloud-based asset. The security token may be generated by the security service to include identifying information according to characteristics or configurations of the cloud-based asset and the virtualization platform deploying the cloud-based asset that are accessed or received from the trusted cloud platform resource. The security token may be provided only to a verified (e.g., authorized or trusted) virtualization platform and made accessible only to those cloud-based assets deployed in the authorized virtualization environment. In some embodiments, the authentication credential may include a two-part token that is usable only when combined. In the disclosed embodiments, a first part of the token may be injected into the authorized or trusted virtualization platform and a second part of the token may be provided to the cloud-based asset. In this way only a cloud-based asset deployed in an authorized, validated virtualization platform has access to both parts of the token and can use it in subsequent requests to communicate with or access an access-controlled resource or to obtain additional authentication credentials for accessing access controlled enterprise resources.

Reference will now be made in detail to the disclosed embodiments, examples of which are illustrated in the accompanying drawings.

Figure 1:
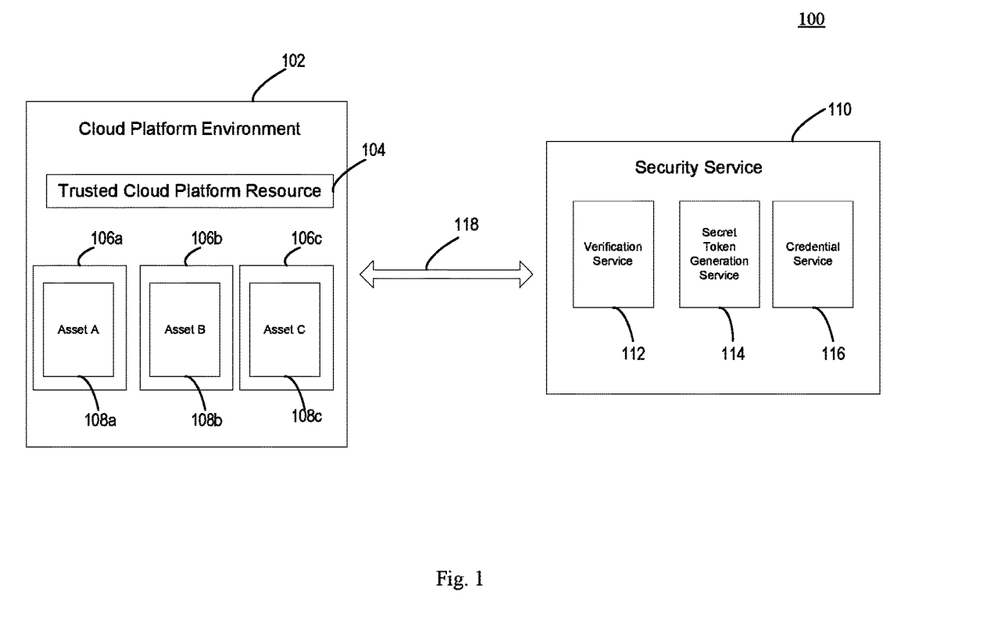
FIG. 1 is a block diagram of an example system, in accordance with disclosed embodiments.

FIG. 1 is a block diagram of an example system 100 for providing a security token to a cloud-based asset consistent with the disclosed embodiments. As shown, system 100 includes a virtualization platform environment 102. Virtualization platform environment 102 can include any cloud-based virtualization environment deployment infrastructure now known or yet to be known, and is not limited to existing virtual machine or container-based implementations.

Virtualization platform environment 102 may include any combination of one or more servers or other computing elements and software configured for hosting one or more of a plurality of virtualization platforms 106a, 106b, and 106c. Virtualization platforms 106a-c may include any one or more of a virtual machine implementation or a container implementation or other virtual implementation hosted or managed by virtualization platform environment 102. Thus, as a non-limiting example, virtualization platform environment 102 may include an AWS (Amazon Web Services™)

cloud deployment infrastructure hosting multiple virtual machine EC2 (Amazon™ Elastic Compute Cloud) instances. Virtualization platform environment 102 may also include the OpenShift™ container application deployment infrastructure for hosting a plurality of containerized applications. As an example, virtualization platform environment 102 may include any combination of a plurality of virtualization platforms including one or more virtual machines or a plurality of containers, or some combination of both. The techniques of the disclosed embodiments are not limited to any particular virtualization platform. And to the extent relevant differences exist between different virtualization platforms, the disclosed embodiments contemplate the required modifications for implementing the generally applicable techniques of the disclosed embodiments for any of the various known or not yet developed cloud deployment infrastructures.

Virtualization platform environment 102 may also include a trusted cloud platform resource 104, which may include a combination of hardware and/or software components for storing any information and capabilities for configuring and managing each of a plurality of validated or authorized virtualization platforms 106a-c and their particular privileges and configurations. Trusted cloud platform resource 104 may include a trusted registry storing authorized or verified configuration information for each of the verified and authorized virtualization platforms 106a-c and/or a platform manager for managing the capabilities and configurations of the plurality of virtualization platforms 106a-c. In the disclosed embodiments, trusted cloud platform resource 104 may also include information corresponding to authorized cloud-based assets 108a, 108b and 108c deployable or deployed within virtualization platforms 106a-c, respectively. In some embodiments, a virtualization platform may be considered a cloud-based asset.

Example information that may be stored or managed by trusted cloud platform resource 104 includes system or disk images used to deploy a particular virtualization platform, such as a virtual machine instance or a container. Other information may include data corresponding to a virtual machine identifier, or a container identifier or container pod identifier of the virtualization platforms 106a-c managed within virtualization platform environment 102, or a namespace or set of namespaces designated for a virtualization platform 106a-c. Trusted cloud platform resource 104 may also include other information pertaining to a particular virtualization platform's operating environment parameters and configurations including the system image with which the virtualization platform is uploaded, as well as other information concerning the types of permissible or running applications, other attributes, annotations, labels, roles, privileges, built-in or hard-coded secrets and any other characteristics and properties that define permissible operations or processes or users permitted to perform operations within the virtualization platform. At least some of this information maintained or managed by trusted cloud platform resource 104 may be used to validate a cloud-based asset in the disclosed embodiments.

Trusted cloud platform resource 104 may include or enable various types of interfaces, such as an application programming interface (API) or command line interface (CLI) for communicating with a security service 110 and one or more of the virtualization platforms 106a-c. Although depicted as within virtualization platform environment 102, trusted cloud platform resource 104 may be implemented separate and independent from virtualization platform environment 102. In some embodiments, for example, trusted cloud platform resource 104 may service a plurality of independent virtualization platform environments 102.

Also shown in FIG. 1 is a security service 110 including a verification service subsystem 112, a secret token generation service subsystem 114, and a credential service subsystem 116. Security service 110 may be implemented as one or more software or hardware components, or a combination of both. Security service 110 may be an independent system or a functional unit of a computing system. In some embodiments, security service 110 may be operable within virtualization platform 102 or may even be executable within one of virtualization platforms 106a-c. For example, in some embodiments, security service 110 may be deployed in various locations and in a variety of ways, including within a particular server or other computing machine, as a service in the network, or as another virtual machine or container in the virtualization platform environment 102. Each of verification service subsystem 112, secret token generation service subsystem 114, and credential service subsystem 116 may be provided as discrete software-based components operable within or controlled by security service 110 to provide discrete functionality. Alternatively, their respective functionalities may be combined in a single subsystem.

As described throughout the disclosed embodiments, verification service 112 may be configured to validate a cloud-based asset based on information obtained from trusted cloud platform resource 104. In some embodiments, verification service 112 may be configured to interact directly with the cloud-based asset. Verification service 112 may be configured to communicate with a trusted cloud platform resource 104 or the cloud-based asset via a communications channel 118, using an Application Programming Interface (API), for example, through a Command Line Interface (CLI), through another form of control console, or another interface system.

Responsive to validating a cloud-based asset and/or a virtualization platform, verification service 112 may provide at least part of the validating information received from the trusted cloud platform resource 104 to a secret token generation service 114 for generating a security token that will enable the requesting cloud-based asset to authenticate itself in subsequent requests and/or to access or communicate with an access-controlled resource.

Secret token generation service 114 may include any known security token generation service, such as a software-based component or other application configured for generating a JSON Web Token (JWT), for example, or another type of security token. Secret token generation service 114 may be configured to enable a cloud-based asset to access the generated security token by injecting the token into a verified or authorized virtualization platform. Thus, in some embodiments, only a cloud-based asset deployed in an authorized virtualization platform is enabled to access the security token. The security token may then be used by the cloud-based asset to request additional credentials from credential service 116 associated with security service 110 and/or to access an access-controlled resource. Credential service 116 may then authenticate additional requests from the cloud-based asset based on the cloud-based asset presenting a valid security token associated with an authorized virtualization platform. Credential service 116 may be configured to perform other operations for generating or providing additional credentials that may be required to access a particular access-controlled resource or target service. In some embodiments, credential service 116 may be configured to implement additional layers of authentication and/or implement one or more enterprise policies for controlling access to the additional credentials.

The system configuration illustrated in FIG. 1 is an example configuration depicting general aspects of the disclosed embodiments. A discussion of techniques and processes for verifying the validity of the cloud-based asset and/or the virtualization platform deploying the cloud-based asset follows with respect to FIG. 2. While certain aspects of the techniques refer to the elements shown in FIG. 1, the disclosed processes are not limited to the particular configuration illustrated in FIG. 1. While various modifications to the general configuration of system 100 are detailed in this disclosure, other modifications are contemplated even if not specifically described. It is noted, for example, that the general principles of the disclosed embodiments are not tied to any specific infrastructure: they may be performed on any computer, server or service, on any infrastructure, on premise, distributed among different infrastructures, and in any cloud. The disclosed systems are operable within any cloud technology and implementation, known and yet to be known in the art. Accordingly, the virtualization platforms, such as containers (or virtual machines in an AWS™ system environment for example) can all be part of the same infrastructure, server, collection of servers, or machine, or be parts of multiple different infrastructures, servers or machines, whether deployed on-premise, in the cloud, or distributed in any other system constellation thereof as known and yet to be known in the art.

Figure 2:
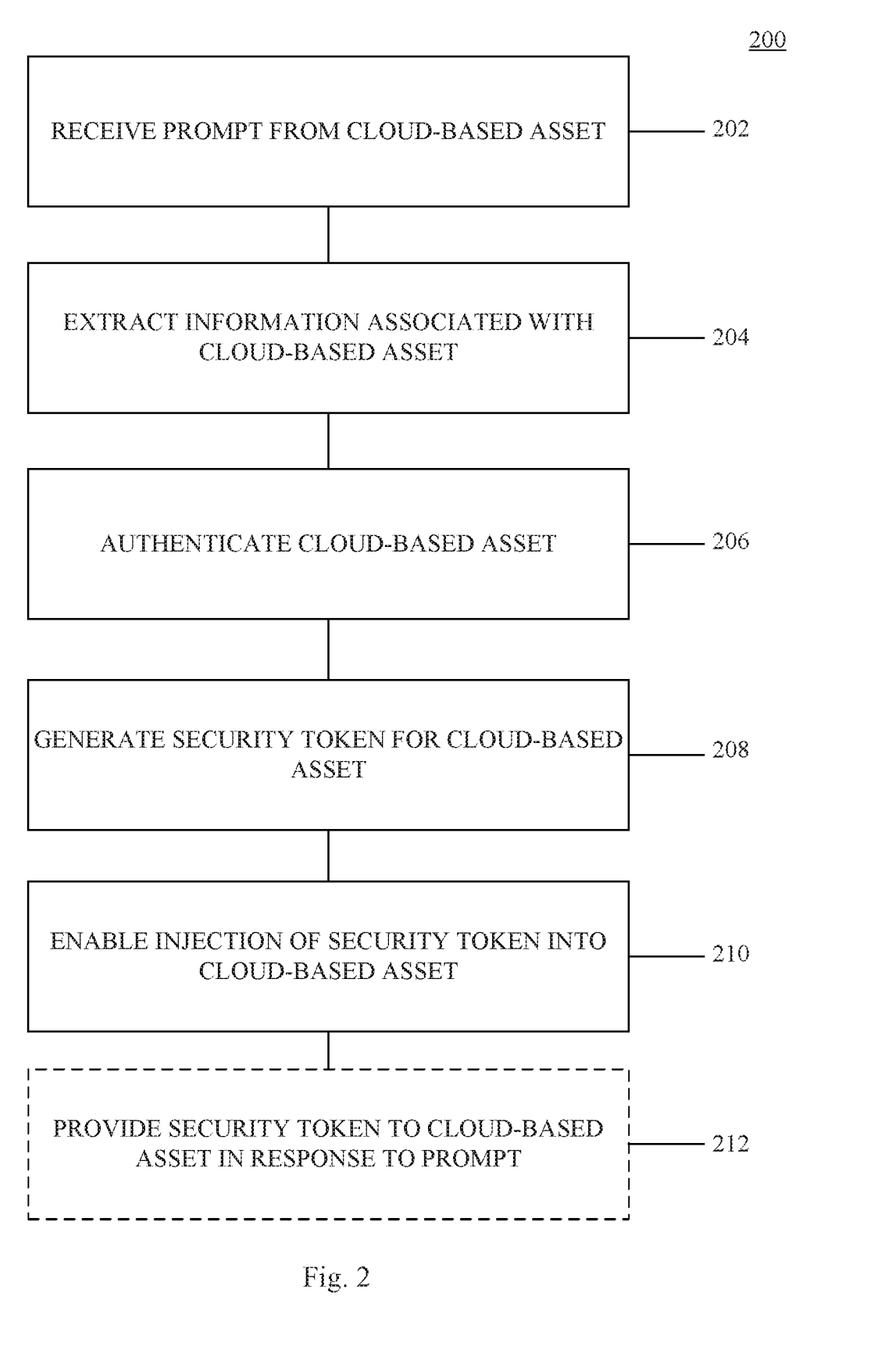
FIG. 2 is a flow chart illustrating an example method for providing a security token to a cloud asset, consistent with the disclosed embodiments.

FIG. 2 includes a flowchart illustrating an example process 200 for validating or authenticating a cloud-based asset, and responsive to authenticating the cloud-based asset, generating and making available to the cloud-based asset an authentication credential, such as a security token that may be used to validate the cloud-based asset in subsequent requests. Aspects of process 200 may be performed by security service 110, verification service 112, and secret token generation service 114 for authenticating any one of a cloud-based asset 108a-c deployed within a respective virtualization platform 106a-c hosted in virtualization platform environment 102, as shown in FIG. 1. Additionally, in some embodiments, trusted cloud platform resource 104 may be configured to perform the operations of process 200.

As part of operation 202, security service 110 may receive, directly or indirectly, a prompt or signal from any one of a cloud-based asset 108a-c via communications channel 118. The received prompt may indicate that the cloud-based asset is seeking to communicate with an access-controlled resource, with which it does not yet have authorization to access or communicate. For example, in some embodiments, a received prompt may include a request for an authentication credential, such as a security token, that may be used to enable the cloud-based asset to access the access-controlled resource. In some embodiments, the prompt may include a request that requires an authentication credential, such as a request to access or communicate with an access-controlled resource. In some embodiments, the cloud-based asset may be required to present an authentication credential before being able to access or communicate with an access-controlled resource, and such a request to access or communicate with an access-controlled resource may be interpreted as a request for an authentication credential.

In some embodiments, the prompt or signal received as part of operation 202 may be generated or issued by the cloud-based asset (e.g., 108a-c) upon creation or spin-up of a virtualization platform (e.g., 106a-c) deploying the cloud-based asset, to automatically enable the cloud-based asset to access an access-controlled resource, for example. In some embodiments, the prompt may be generated or issued upon deployment of the cloud-based asset or other processes within the respective virtualization platform. In the disclosed embodiments, a cloud-based asset or its virtualization platform may be configured to issue the prompt to security service 110 at runtime or upon instantiation of a particular process associated with the cloud-based asset, or otherwise on demand. Alternatively, a virtualization platform or other process associated with the virtualization platform may be configured to redirect a prompt to security service 110 or generate the prompt to security service 110 on behalf of a cloud-based asset. Additionally, in some embodiments, a cloud-based asset or virtualization platform may issue a prompt when it is determined that an authentication credential is needed in order to execute a process or to communicate with an access-controlled resource, for example. Alternatively, the cloud-based asset or virtualization platform may issue the prompt received in operation 202 as part of a request to access or communicate with an access-controlled resource, without necessarily requesting an authentication credential.

In the disclosed embodiments, an access-controlled resource may include any resource configured with access restrictions, including a host configured to accept and broker access requests or communication requests on behalf of one or more other access-controlled resources. Alternatively, an access-controlled resource includes any resource or service, including those containing sensitive information or those enabling access to sensitive information or capabilities within an enterprise.

In some embodiments, the prompt or signal received as part of operation 202 may include identification information identifying the cloud-based asset 108a-c issuing the prompt and/or the respective virtualization platform 106a-c deploying the cloud-based asset. The received identification information may include a location attribute, such as any information that is indicative of a location or identifier of virtualization platform 106a-c deploying the cloud-based asset. An example location attribute may include a virtual machine identifier, container identifier, pod identifier or other identifier indicative of a location of a container or virtual machine. The received identification information may also include an identifier of a particular virtual machine or container process, operation or application executed in a virtualization platform 106a-c. In some embodiments, for example, the received identification information may include a platform environment attribute, such as a virtual machine namespace, when the cloud-based asset is deployed in a virtual machine environment, or a container namespace, when the cloud-based asset is deployed in a container environment. Other environment attributes may include a particular process identifier associated with the cloud-based asset, such as a process ID or a process namespace running within the virtual machine or container environment, or other application identifier associated with the cloud-based asset. In some embodiments, the received identification information does not correspond to secret information, but rather it includes common information that serves to identify a virtualization platform 106a-c deploying the cloud-based asset.

As part of operation 204, security service 110 or verification service 112 may extract additional information regarding the virtualization platform 106a-c or cloud-based asset 108a-c associated with the received prompt as part of operation 202. In some embodiments, verification service 112 may invoke a trusted cloud platform resource 104 to interoperate with the cloud-based asset to obtain additional information. In some embodiments, verification service 112 is configured to communicate with or access trusted cloud platform resource 104, via communications channel 118, to extract additional information about the cloud-based asset 108a-c associated with the prompt and/or the virtualization platform 106a-c deploying the cloud-based asset 108a-c. In some embodiments, verification service 112 may be configured to interoperate directly with the cloud-based asset to obtain additional information. Verification service 112 may obtain the additional information using at least some of the identifying information concerning the virtualization platform and/or cloud-based asset received as part of operation 202.

For example, in some embodiments, verification service 112 may communicate with an appropriate trusted cloud platform resource 104, one that manages the deploying virtualization platform 106a-c associated with the identifying information received in operation 202. Verification service 112 may communicate with the trusted cloud platform resource 104 using an application programming interface (API) for example. Verification service 112 may query trusted cloud platform resource 104 using any one of namespace and virtual machine, pod, or container identifier, for example, or other identifying information as received in operation 202 to obtain additional information about the identified virtualization platform deploying the cloud-based asset seeking to communicate with an access-controlled resource. Verification service 112 may receive, for example, any additional information including the identified virtualization platform's IP address, operating environment variables and parameters, permissions, attributes, permissible operations and applications, etc. In the disclosed embodiments, verification service 112 may access any information stored or managed by the trusted cloud platform resource 104 concerning the identified virtualization platform 106a-c and/or the cloud-based asset 108a-c. In some embodiments, verification service 112 may obtain similar additional verification information by interoperating directly with the cloud-based asset 108a-c.

As part of operation 206, verification service 112 may authenticate the cloud-based asset that issued the prompt received in operation 202 based on the information obtained from trusted cloud platform resource 104 or from the cloud-based asset itself. For example, verification service 112 may determine from the obtained information whether the cloud-based asset is associated with a trusted or verified virtualization platform 106a-c and/or whether a characteristic of the cloud-based asset 108a-c is consistent with the permissions and configurations, etc. for the verified virtualization platform 106a-c. Responsive to authenticating the cloud-based asset and/or the virtualization platform deploying the cloud-based asset, verification service 112 may communicate with secret token generation service 114 to generate a secret token that may be used by the cloud-based asset to authenticate itself in subsequent requests.

In some embodiments, verification service 112 may be configured to implement additional operations or processes to authenticate the cloud-based asset. For example, in some embodiments, verification service 112 may be configured to apply one or more policies or control actions configured by security service 110 that governs the way the security service is to respond to prompts or requests received by a cloud-based asset, and/or in general also governs the operation of the cloud-based asset itself. For example, verification service 112 may control the response to the cloud-based asset request by determining whether to provide an authentication credential prior to querying the trusted cloud platform resource 104. For example, verification service 112 may implement rules for future cloud-based asset requests and/or operations that can be performed using a policy that further takes into account history of events and activity associated with a plurality of different virtualization platforms and/or cloud-based assets, other than the requesting cloud-based asset. In other words, verification service 112 may take into account activity in the entire virtualization platform environment when considering a response to a received prompt or request from a cloud-based asset. For example, verification service 112 may determine that similar requests have been issued by a different cloud-based asset or by the same cloud-based asset within a predetermined period of time. Verification service 112 may also be configured to monitor for any abnormal behavior or requests, and determine whether to deny such requests or monitor actions associated with the request.

Verification service 112 may also include capabilities for conditioning the return of an authentication credential on another process or service, for example by going through another ticketing system and/or by providing an additional layer of verification. In some embodiments, an additional layer of verification may be provided by the trusted cloud platform resource 104. For example, the trusted cloud platform resource 104 may be configured to, or controlled to, execute instructions or code on a virtualization platform and/or the cloud-based asset to obtain a higher resolution about the cloud-based asset deployed in the virtualization platform. The executable instructions, for example, may be configured to obtain information concerning a cloud-based asset's path, hash, OS user, or other detailed information pertaining to the operation or storage of the cloud-based asset within a virtualization platform.

The above examples include obtaining information about a virtualization platform that may be dedicated for a cloud-based asset, in a so-called server based environment. The general principles, however, are also applicable in serverless environments, where a cloud-based asset may include code that is executed in a cloud-based deployment infrastructure without a dedicated virtualization platform being associated with the cloud-based asset. In such a serverless environment, verification service 112 and/or trusted cloud platform resource 104 may be configured to perform one or more operations or execute instructions for interoperating directly with the cloud-based asset to obtain information concerning the cloud-based asset's path, hash, OS user, or other detailed information pertaining to the operation the cloud-based asset within the serverless virtualization platform.

As part of operation 208, secret token generation service 114 generates an authentication credential, such as a secret security token based at least in part on the additional information received as part of operation 204. A secret token in the disclosed embodiments may be unique to the cloud-based asset and/or the virtualization platform 106a-c deploying the cloud-based asset. The token may be generated according to various methods for generating a signed authentication token to be used to access web-based, cloud-deployed, or local access-controlled resources. One such service for generating a signed token may include that for generating a JWT, for example. In some embodiments, a single signed token may be generated for the cloud-based asset including information identifying the respective virtualization platform 108a-c deploying the cloud-based asset, as well as other information specifying an issue date or an expiration time for the token or other information, such as random data for uniquely identifying the security token. In the disclosed embodiments, any authentication credential, or secret security token that is capable of authenticating the cloud-based asset, may be implemented.

Figure 3:
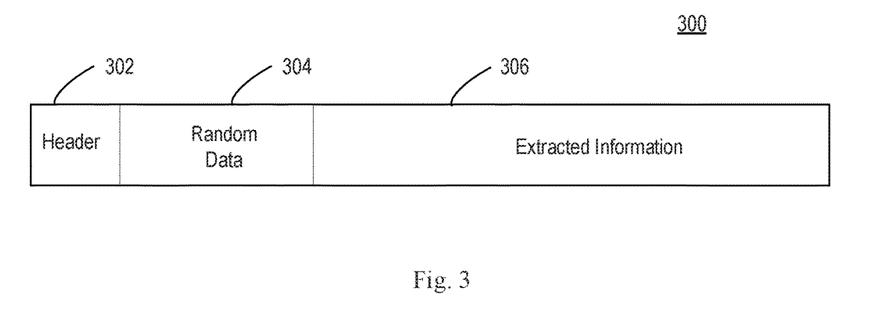
FIG. 3 is an exemplary depiction of a first part of a security token, consistent with the disclosed embodiments.
Figure 4:
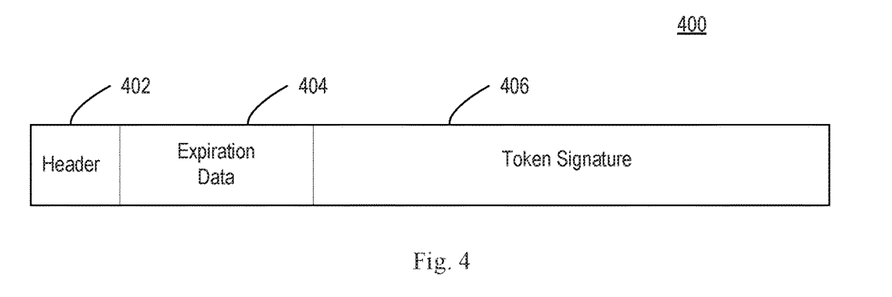
FIG. 4 is an exemplary depiction of a second part of a security token, consistent with the disclosed embodiments.

In some embodiments, a multi-part token may be generated that includes separate and distinct parts that may be usable only in combination, such as a first part 300, as shown in FIG. 3, and a second part 400, as shown in FIG. 4. For example, in some embodiments, secret token generation service 114 may generate a token including a series of randomized data uniquely generated for the token. The randomized data may also be uniquely associated with the cloud-based asset. The security token may also include some of the information obtained from the trusted cloud platform resource 104 in operation 204, identifying the authorized virtualization platform and/or the deployed cloud-based asset. The generated security token may be unique to the virtualization platform deploying the cloud-based asset, and thus may include information unique to a particular container or virtual machine, for example. The generated token may also include other information, such as a date, expiration time data, and a token signature that is calculated on the entire token, as shown and described in FIGS. 3 and 4, for example. Once the token is signed, secret token generation service 114 may separate the token into separate and distinct parts, as shown in FIGS. 3 and 4. To ensure each token part cannot be predictable and/or faked, for example, a first part 300 (FIG. 3) of the token may contain the uniquely generated randomized data and a second part 400 (FIG. 4) of the token may contain the token signature calculated on the whole, now two piece token. Other similar partitions are also contemplated. In the disclosed embodiments, each part of the token may be unusable on its own, thus forming a valid and usable authentication credential only upon being concatenated together or otherwise processed together.

As part of operation 210, security service 110 may enable injection of the security token generated as part of operation 208 into the verified virtualization platform and/or the authenticated cloud-based asset authenticated in operation 206. In some embodiments, the security token generated as part of operation 208 or a part of the generated security token may be provided to a cloud resource separate from the cloud-based asset, which may be configured to inject the security token into the trusted virtualization platform and/or the authenticated cloud-based asset. In some embodiments, the security token may be provided to the trusted cloud platform resource 104 including instructions requesting the trusted cloud platform resource to inject the security token or a part thereof into the cloud-based asset. In some embodiments, trusted cloud platform resource 104 may inject the security token into the trusted virtualization platform 106*a-c* by writing the security token to a system file, configuration file, or environment variable within the virtualization platform filesystem such that it is accessible to the cloud-based asset deployed within the virtualization platform. The security token may be provided to the trusted cloud platform resource 104 via a communications channel separate and distinct from the communications channel on which the prompt was received as part of operation 202. Thus, in some embodiments, the generated security token may be provided in an out-of-band communications channel.

Upon injecting the security token into the trusted virtualization platform, the trusted cloud platform resource 104 may provide a notification to the security service 110. In some embodiments, the notification may include location information of the security token, such as a filename or filepath that is accessible to the cloud-based asset. In response to the notification, security service 110 may respond to the prompt issued by the cloud-based asset and received as part of operation 202 with the location information of the generated security token.

In some embodiments, security service 110 may be configured to inject the security token into the virtualization platform via an API with the trusted cloud platform resource 104 to write the token into a file accessible to the cloud-based asset. The accessible file may be stored within the virtualization platform or otherwise accessible to the cloud-based asset. Alternatively, security service 110 may be configured to connect to the trusted virtualization platform 106*a-c* deploying the cloud-based asset using an IP address of the trusted virtualization platform, such as through an SSH, Telnet, or RDP communication link and write the token into a file of the virtualization platform. In other embodiments, secret service 110 may be configured to write the security token to a file or volume with which the trusted virtualization platform and/or authenticated cloud-based asset have shared access, thus enabling the authenticated cloud-based asset to access the security token from the shared volume. Other techniques known in the art for making the security token available to a cloud-based asset deployed within a trusted virtualization platform may be implemented. Security service 110 may then respond to the prompt received as part of operation 202 with a notification including location information of the security token accessible to the cloud-based asset.

Operation 212 may be performed in embodiments where a multi-part security token is generated as part of operation 208. As part of operation 212, one of the parts of the generated security token may be injected into the virtualization platform or cloud-based asset as is similarly performed in operation 210, whereas a second part of the generated security token may be returned to the cloud-based asset in response to the prompt received in operation 202. In this embodiment, the second part of the generated security token may be returned to the cloud-based asset. The second part of the generated security token may be returned responsive to the security service 110 receiving an indication that the first part of the security token has been injected into the virtualization platform or cloud-based asset. The indication received by security service 110 may include, for example, location information of the security token. Security service 110 may provide the second part of the security token and the location information of the first part of the security token to the cloud-based asset. In some embodiments, the second part of the security token may be provided directly to the cloud-based asset in response to the prompt received in operation 202. Using the location information, the cloud-based asset may be enabled to access the first part of the security token and concatenate or otherwise combine the first part with the received second part of the security token to create a valid and usable security token. A concatenated or otherwise combined valid and usable security token may then enable the cloud-based asset to access an access-controlled resource, or to obtain an additional credential needed for accessing the access-controlled resource. In some embodiments, the additional credential may be injected into the cloud-based asset according to the example implementations discussed above with respect to operation 210.

In some embodiments, once a cloud-based asset obtains a security token, at least by accessing a part of the security token injected into a verified virtualization platform, the cloud-based asset may use the security token to retrieve additional credentials or secrets that may enable the cloud-based asset to access or communicate with a target service or access-controlled resource. Security service 110 and/or credential service 116 may receive each subsequent access request and verify the information contained within the security token to determine whether to authorize the request.

FIG. 3 illustrates an exemplary first part 300 of a security token, in accordance with the disclosed embodiments. As shown in FIG. 3, and consistent with the above discussion of operation 208, for example, a first part 300 of a two-part security token may include a header portion 302, a random data portion 304, and a portion including extracted information 306 about a cloud-based asset and/or a virtualization platform deploying the cloud-based asset. Extracted information 306 may include at least some of the information obtained from trusted cloud platform resource 104, as part of operation 204, for example. Such extracted information may include, for example, any information uniquely identifying the cloud-based asset and/or information uniquely identifying the particular virtualization platform deploying the cloud-based asset. Random data portion 304 may include any data randomly or pseudorandomly generated that may uniquely identify a security token. Header portion 302 may include any data for identifying characteristics of the security token, such as a type of data embedded in the token, a type of the token, the generation service generating the token, a date or time of generation, a signing algorithm used to sign the token, etc., or any other information that may be used to identify the token and facilitate its use and validation. In some embodiments, header portion 302 may include an identifier indicating it is a first part of a two-part security token, and may include other information indicative of how a recipient is to combine the first part with the second part to validate the two-part security token.

FIG. 4 illustrates an exemplary second part 400 of a security token, in accordance with the disclosed embodiments. As shown in FIG. 4, and consistent with the above discussion of operation 208, a second part 400 of a two-part security token may include a header portion 402, an expiration data portion 404, and a signature portion 406 including a signature of the entire concatenated two-part token including the data of first part 300 and second part 400. Header portion 402 may include the same data and type of data that may be included in header portion 302. Header portion 402, however, may include an identifier indicating it is a second part of a two-part security token. Expiration data portion 404 may include any data indicative of duration for which the security token is to remain valid. Expiration data portion 404 may include for example, a particular date, or time at which the token will become invalid. Additionally, expiration data portion may include a counter referencing the number of times the security token may be used, or specifying a period of time the token may be in use. Any data that may be used to control the frequency or period of use of a security token (and that may be verifiable or used by a security service to validate the security token), may be included in expiration data portion 404, whether such data refers to timing data or frequency data or a set date or time. Signature portion 406 may include signature data generated on behalf of an entire two-part token before the token is partitioned into first part 300 and second part 400. Thus, the signature data in signature portion 406 may be validated only upon a concatenation of first part 300 and second part 400.

First part 300 and second part 400 may include additional or alternative information, and thus are not limited to the data or arrangement of data illustrated in FIGS. 3 and 4, for example.

An example use case is now described, based on the methods and systems described above. For example, the example case is directed to a container based implementation according the OpenShift™ platform, and thus includes syntax unique to OpenShift™. It will be understood that the example use case is merely illustrative and is not meant to be limiting.

Prior to performing the processes of the disclosed embodiments, an enterprise administrator may predefine an application to be run in an OpenShift™ container. The predefined definition includes any information that represents the application and identifies the secrets it has access to. For example, an arbitrary predefined application "BillingApp" may be expected to have two environment variables: variable "Environment" with the value of "Development" and environment variable "Type" with the value of "Important". The application is configured according to an image with a name of "image_server:5000/Billing/BillingImage" and namespace with the value of "BillingProject". The administrator may then select or determine any secrets this application may have access to.

Then, as part of operation 202, the "BillingApp" application (e.g., cloud-based asset) sends a prompt to or calls a security service, such as security service 110. The application may prompt security service 110 using a REST web services API, for example, and provides its namespace and pod name.

As part of operation 204, security service 110 or verification service 112, receives the cloud-based assets namespace and pod name and then calls the OpenShift™ Platform Manager API, for example, to investigate or retrieve additional information on the identified container. Example information that may be retrieved includes environment variables of each container in the pod, annotations, image, image name, IP address, container IDs, etc.

Upon authenticating the cloud-based asset, based on the retrieved additional information, security service 110 generates a two-part token. The security service establishes an out-of-band connection to the identified container running in the identified pod and writes part of the secret token in a temporary file. Security service 110 then provides the remaining portion of the secret token as a response to the REST web service request received in operation 202. The "BillingApp" application is enabled to use the security token only if it has obtained all parts, that given out-of-band directly into the "investigated" container, and that provided in the response to the initial request.

Upon receiving a subsequent request (including the security token) for an additional credential from the "BillingApp" application deployed in the investigated container, security service 110 may verify the application information contained in the security token to determine whether the application is authorized to receive the requested additional credential. For example, security service 110 may determine whether the application is running with the environment variables mentioned above (Environment and Type) with the proper values (Development and Important), that the application runs in a namespace "BillingProject" and runs in a container that was started with an image named "image_server:5000/Billing/BillingImage". If the security service is able to authenticate the application information, the application will be authenticated. Security service 110 may then generate or retrieve the requested secrets authorized for the application enabling the application to access other targeted systems or services.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of the these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for providing security tokens to cloud-based assets on demand over a network, comprising:
    receiving a prompt from a cloud-based asset indicating that the cloud-based asset is seeking to communicate with an access-controlled resource, wherein the cloud-based asset lacks authorization to communicate with the access-controlled resource;
    extracting information associated with the cloud-based asset by, at least in part, accessing a trusted cloud platform resource storing data associated with verified cloud-based assets, the trusted cloud platform resource being separate from the cloud-based asset;
    authenticating the cloud-based asset based on the extracted information, wherein the extracted information is based on characteristics or configurations of the cloud-based asset and a virtualization platform deploying the cloud-based asset that is known to or managed by the trusted cloud platform resource;
    generating a security token for the cloud-based asset;
    making a first portion of the security token available to be injected into the cloud-based asset;
    responding to the prompt with a second portion of the security token;
    injecting the first portion of the security token into the cloud-based asset; and
    enabling the cloud-based asset to obtain a credential needed for accessing the access-controlled resource by using the first portion of the security token and further based on the response to the prompt with the second portion of the security token.

2. A non-transitory computer readable medium according to claim 1, wherein the extracting involves invoking the trusted cloud platform resource to interoperate with the cloud-based asset to obtain at least part of the extracted information.

3. A non-transitory computer readable medium according to claim 1, wherein the extracting involves interoperating directly with the cloud-based asset.

4. A non-transitory computer readable medium according to claim 1, wherein the security token is unique to the cloud-based asset.

5. A non-transitory computer readable medium according to claim 1, wherein the steps of receiving a prompt, extracting, accessing, authenticating, generating, making, and responding are performed by the trusted cloud platform resource.

6. A non-transitory computer readable medium according to claim 1, wherein the prompt identifies a container associated with the cloud-based asset.

7. A non-transitory computer readable medium according to claim 6, wherein the security token is unique to the container associated with the cloud-based asset.

8. A non-transitory computer readable medium according to claim 1, wherein the prompt indicates a location attribute of the cloud-based asset.

9. A non-transitory computer readable medium according to claim 1, wherein the prompt indicates an environment attribute of the cloud-based asset.

10. A non-transitory computer readable medium according to claim 1, wherein the first portion of the security token includes random data and data associated with the cloud-based asset.

11. A non-transitory computer readable medium according to claim 1, wherein the second portion of the security token includes expiration time data.

12. A non-transitory computer readable medium according to claim 1, wherein the second portion of the security token includes a token signature.

13. A non-transitory computer readable medium according to claim 1, wherein making a first portion of the security token available to be injected into the cloud-based asset includes sending the first portion of the security token to a cloud resource separate from the cloud-based asset.

14. A non-transitory computer readable medium according to claim 13, further comprising requesting the cloud resource to inject the first portion of the security token into the cloud-based asset.

15. A non-transitory computer readable medium according to claim 1, wherein responding to the prompt with a second portion of the security token occurs after receiving an indication that the first portion of the security token has been injected into the cloud-based asset.

16. A non-transitory computer readable medium including instructions that, when executed by at least one processor, cause the at least one processor to perform operations for providing security tokens to cloud-based assets on demand over a network, comprising:
    receiving a prompt from a cloud-based asset indicating that the cloud-based asset is seeking to communicate with an access-controlled resource, wherein the cloud-based asset lacks authorization to communicate with the access-controlled resource;
    extracting information associated with the cloud-based asset by, at least in part, accessing a trusted cloud platform resource storing data associated with verified cloud-based assets, the trusted cloud platform resource being separate from the cloud-based asset;
authenticating the cloud-based asset based on the extracted information, wherein the extracted information is based on characteristics or configurations of the cloud-based asset and a virtualization platform deploying the cloud-based asset that is known to or managed by the trusted cloud platform resource;
generating a security token for the cloud-based asset;
making at least a first portion of the security token available to be injected into the cloud-based asset;
injecting the first portion of the security token into the cloud-based asset; and
enabling the cloud-based asset to obtain a credential needed for accessing the access-controlled resource by using the first portion of the security token and further based on a second portion of the security token.

17. A server system for providing security tokens to a cloud-based asset on demand over a network, the system comprising:
a memory device storing a set of instructions; and
a processor configured to execute the set of instructions to:
receive a prompt from a cloud-based asset indicating that the cloud-based asset is seeking to communicate with an access-controlled resource, wherein the cloud-based asset lacks authorization to communicate with the access-controlled resource;
extract information associated with the cloud-based asset by, at least in part, accessing a trusted cloud platform resource storing data associated with verified cloud-based assets, the trusted cloud platform resource being separate from the cloud-based asset;
authenticate the cloud-based asset based on the extracted information, wherein the extracted information is based on characteristics or configurations of the cloud-based asset and a virtualization platform deploying the cloud-based asset that is known to or managed by the trusted cloud platform resource;
generate a security token for the cloud-based asset;
make a first portion of the security token available to be injected into the cloud-based asset;
respond to the prompt with a second portion of the security token;
inject the first portion of the security token into the cloud-based asset; and
enable the cloud-based asset to obtain a credential needed for accessing the access-controlled resource by using the first portion of the security token and further based on the response to the prompt with the second portion of the security token.

18. A computer-implemented method, executable by a processor of a computing system, for providing a security token to a cloud-based asset on demand over a network, the method comprising:
receiving a prompt from a cloud-based asset indicating that the cloud-based asset is seeking to communicate with an access-controlled resource, wherein the cloud-based asset lacks authorization to communicate with the access-controlled resource;
extracting information associated with the cloud-based asset by, at least in part, accessing a trusted cloud platform resource storing data associated with verified cloud-based assets, the trusted cloud platform resource being separate from the cloud-based asset;
authenticating the cloud-based asset based on the extracted information, wherein the extracted information is based on characteristics or configurations of the cloud-based asset and a virtualization platform deploying the cloud-based asset that is known to or managed by the trusted cloud platform resource;
generating a security token for the cloud-based asset;
making a first portion of the security token available to be injected into the cloud-based asset;
responding to the prompt with a second portion of the security token;
injecting the first portion of the security token into the cloud-based asset; and
enabling the cloud-based asset to obtain a credential needed for accessing the access-controlled resource by using the first portion of the security token and further based on the response to the prompt with the second portion of the security token.

19. A computer-implemented method according to claim 18, wherein the extracting involves invoking the trusted cloud platform resource to interoperate with the cloud-based asset to obtain at least part of the extracted information.

20. A computer-implemented method according to claim 18, wherein the security token is unique to a virtualization platform deploying the cloud-based asset.

21. A computer-implemented method according to claim 18, wherein making a first portion of the security token available to be injected into the cloud-based asset includes sending the first portion of the security token to a cloud resource separate from the cloud-based asset.

22. A computer-implemented method according to claim 21, further comprising requesting the cloud resource to inject the first portion of the security token into the cloud-based asset.

* * * * *